US007278374B2

(12) United States Patent
Mann

(10) Patent No.: US 7,278,374 B2
(45) Date of Patent: Oct. 9, 2007

(54) TREAT RETAINING PET TOY AND TREATS THEREFOR

(75) Inventor: Charles D. Mann, Marine on St. Croix, MN (US)

(73) Assignee: Premier Pet Products, LLC, Richmond, VA (US)

( * ) Notice: Subject to any disclaimer, the term of this patent is extended or adjusted under 35 U.S.C. 154(b) by 210 days.

(21) Appl. No.: 10/535,031

(22) PCT Filed: Sep. 5, 2003

(86) PCT No.: PCT/US03/27852

§ 371 (c)(1),
(2), (4) Date: May 13, 2005

(87) PCT Pub. No.: WO2004/043142

PCT Pub. Date: May 27, 2004

(65) Prior Publication Data

US 2006/0048718 A1    Mar. 9, 2006

Related U.S. Application Data

(60) Provisional application No. 60/425,888, filed on Nov. 13, 2002.

(51) Int. Cl.
*A01K 29/00* (2006.01)
(52) U.S. Cl. .................................. 119/710; 119/51.03
(58) Field of Classification Search ............ 119/51.03, 119/710, 711; 43/2, 131
See application file for complete search history.

(56) References Cited

U.S. PATENT DOCUMENTS

| 759,030 | A | * | 5/1904 | Sheaffer | ...................... | 43/131 |
|---|---|---|---|---|---|---|
| 1,006,182 | A | | 10/1911 | Cousin | | |
| 1,022,112 | A | | 4/1912 | Smith | | |
| 1,534,964 | A | | 4/1925 | Kahnweiler | | |
| 1,843,864 | A | | 2/1932 | Burnett | | |
| 2,086,631 | A | | 7/1937 | Munro | ........................ | 272/86 |
| 2,959,354 | A | | 11/1960 | Beck | ........................... | 239/36 |
| 3,071,476 | A | | 1/1963 | Werft et al. | ................... | 99/135 |
| 3,704,539 | A | * | 12/1972 | Alvarez | ....................... | 43/131 |
| 3,717,949 | A | | 2/1973 | Radovan | ........................ | 45/61 |

(Continued)

FOREIGN PATENT DOCUMENTS

EP    1 048 209 A2    4/2000

OTHER PUBLICATIONS

"Kong Stuffing" Advertisement, *Pet Business* Magazine, May 1995.

(Continued)

*Primary Examiner*—Rob Swiatek
(74) *Attorney, Agent, or Firm*—Leanne R. Taveggia; Westman, Champlin & Kelly, P.A.

(57) ABSTRACT

A non-consumable pet toy (100) includes a resilient first concave-shaped molded member (102) having a first peripheral edge (130) and a resilient second concave-shaped molded member (104) having a second peripheral edge (132). The first and second members have a treat-retaining cavity (101) between them. The treat retaining pet toy also includes a fastener (110, 112) extending centrally through the treat-retaining cavity. The fastener fastens the first member to the second member such that the first peripheral edge is at a predetermined distance from the second peripheral edge.

19 Claims, 9 Drawing Sheets

U.S. PATENT DOCUMENTS

| | | |
|---|---|---|
| 4,802,444 A | 2/1989 | Markham et al. .............. 119/29 |
| 5,076,214 A | 12/1991 | Petit ......................... 119/51.03 |
| RE34,352 E | 8/1993 | Markham et al. ........... 119/710 |
| 5,232,130 A | 8/1993 | Woodard ..................... 222/464 |
| 5,343,828 A | 9/1994 | Houghton et al. ........ 119/31.03 |
| 5,595,142 A | 1/1997 | Chill ........................... 119/710 |
| 5,611,165 A * | 3/1997 | Blaha .............................. 43/1 |
| 5,813,366 A | 9/1998 | Mauldin, Jr. ................. 119/710 |
| 5,819,690 A | 10/1998 | Brown ........................ 119/707 |
| 5,832,877 A | 11/1998 | Markham ................... 119/710 |
| 5,865,146 A | 2/1999 | Markham ................... 119/707 |
| 5,947,061 A | 9/1999 | Markham et al. ........... 119/710 |
| 6,129,053 A | 10/2000 | Markham et al. ........... 119/710 |
| 6,237,538 B1 | 5/2001 | Tsengas ...................... 119/707 |
| 6,289,846 B1 * | 9/2001 | Long ........................ 119/51.03 |
| 6,427,634 B1 | 8/2002 | Mann .......................... 119/709 |
| 6,439,166 B1 | 8/2002 | Markham ................... 119/710 |
| 6,470,830 B2 | 10/2002 | Mann .......................... 119/709 |
| 6,546,896 B1 | 4/2003 | Markham ................... 119/709 |
| 2001/0047770 A1 | 12/2001 | Pontes ........................ 119/707 |
| 2005/0045115 A1 | 3/2005 | Mann .......................... 119/711 |

OTHER PUBLICATIONS

Recipe for the Perfect Dog, Kong Company brochure, 1997.
International Preliminary Examination Report from related PCT Application No. PCT/US03/27852.
Written Opinion from related PCT Application No. PCT/US03/27852.

* cited by examiner

TREAT RETAINING PET TOY AND TREATS THEREFOR

CROSS-REFERENCE TO RELATED APPLICATIONS

This Application is a Section 371 National Stage Application of International Application No. PCT/US2003/027852, filed Sep. 5, 2003 and published as WO 2004/036297 on May 27, 2004, in English, the application of which is based on and claims the benefit of U.S. provisional patent application Ser. No. 60/425,888, filed Nov. 13, 2002.

BACKGROUND OF THE INVENTION

This invention relates to pet toys, and more particularly to toys for carnivorous animals such as dogs and cats.

Non-consumable pet toys for pet carnivores, such as dogs and cats, provide a variety of beneficial functions for the pet. Chewing on non-consumable toys furnish an outlet for masticatory exercises, dental prophylaxis, relief while teething, boredom, loneliness, separation anxiety and exploration. To enhance the attractiveness of the toy to the pet carnivore, sensory attractants maybe incorporated into the toy. These attractants are either an integral part of the toy and molded into the material of the toy, or retained in a cavity or other attractant-holding mechanism designed to retain a replaceable attractant.

In some cases, the cavity loosely retains at least a portion of the treat allowing the treat to be easily crushed and obtained by the pet carnivore. In other cases, the treat is held in a treat-retaining slot or other device having an opening through which the treat is inserted. Often the treat is inadequate to withstand the force needed for insertion of the treat in which case the treat breaks into small pieces upon insertion which are too small to be retained correctly, thus rendering the toy relatively useless as an attractant holder.

Many pet toys are used by animal handlers and owners to encourage social interaction between the handler and the animal. Others are used to occupy the pet when the owners are absent and need to leave the dog alone. Hence, commercially successful pet toys are attractive to the owner or handler, are easy to use, and retain the interest of the animal for a considerable period of time. Most pet owners and handlers purchase pet toys that have multiple attractive appendages and/or multiple colors.

SUMMARY OF THE INVENTION

A non-consumable pet toy includes a resilient first concave-shaped molded member having a first peripheral edge and a resilient second concave-shaped molded member having a second peripheral edge. The first and second members have a treat-retaining cavity between them. The pet toy also includes a fastener extending centrally through the treat-retaining cavity. The fastener fastens the first member to the second member such that the first peripheral edge is at a predetermined distance from the second peripheral edge.

Another embodiment of the present invention is directed to a treat for nesting in a resilient treat-retaining pet toy. The treat includes a substantially solid, rigid, edible body in the shape of a toroid. The treat has an outer diameter not greater than a minimum diameter of the toy cavity and a thickness at the outer diameter not greater than a minimum height of the cavity. The treat also has an inner diameter forming a center opening of the body not smaller than a diameter of a fastener. Consequently, the treat can be placed in the treat-retaining cavity without deforming the toy.

BRIEF DESCRIPTION OF THE DRAWINGS

FIGS. 2-1 and 2-2 are section views of the treat retaining pet toy in accordance with the embodiment illustrated in FIG. 1.

DETAILED DESCRIPTION OF THE PREFERRED EMBODIMENTS

Figure 1:
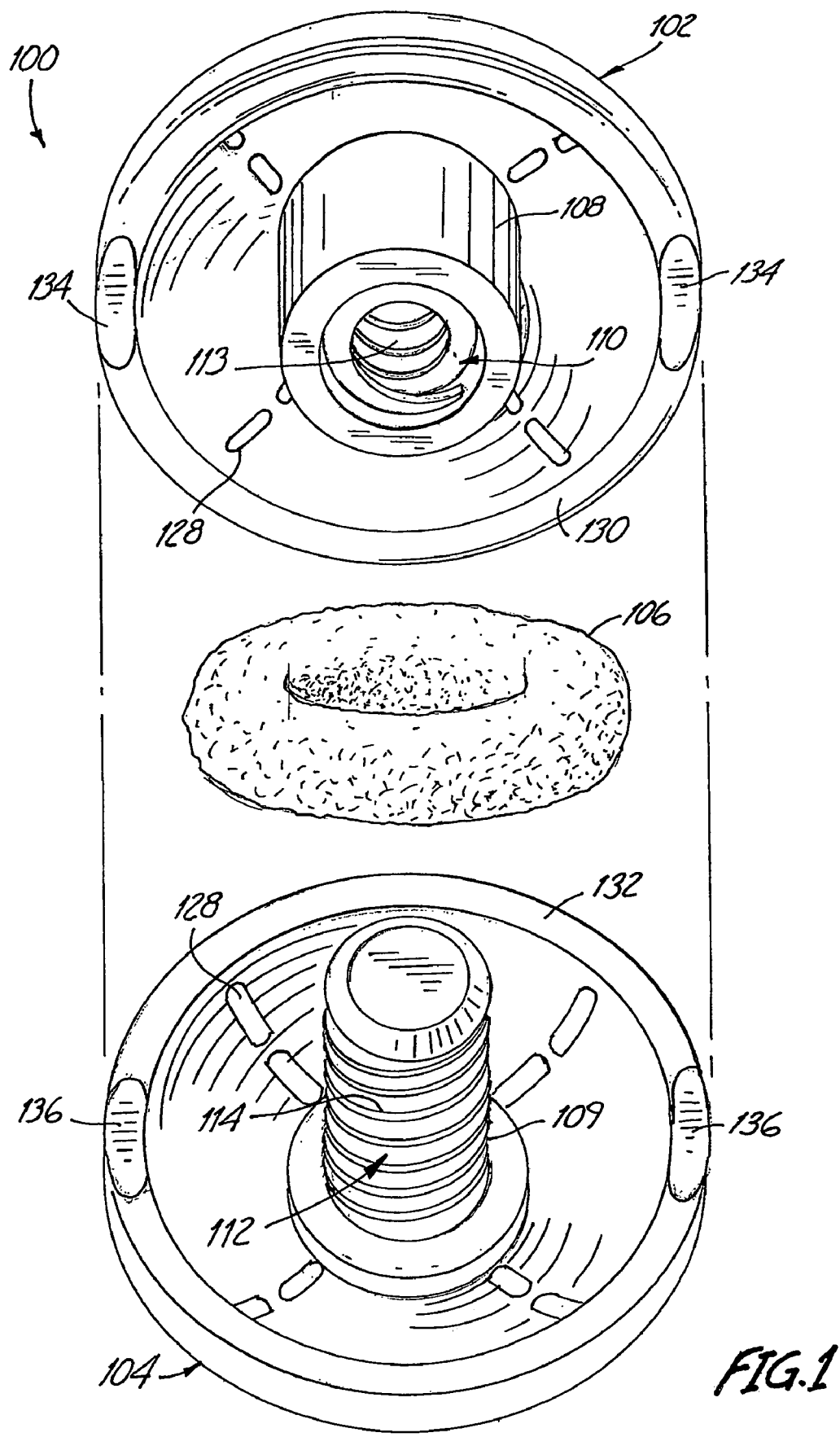
FIG. 1 is an exploded perspective view of one embodiment of the treat retaining pet toy of the present invention.
Figures 1, 2:
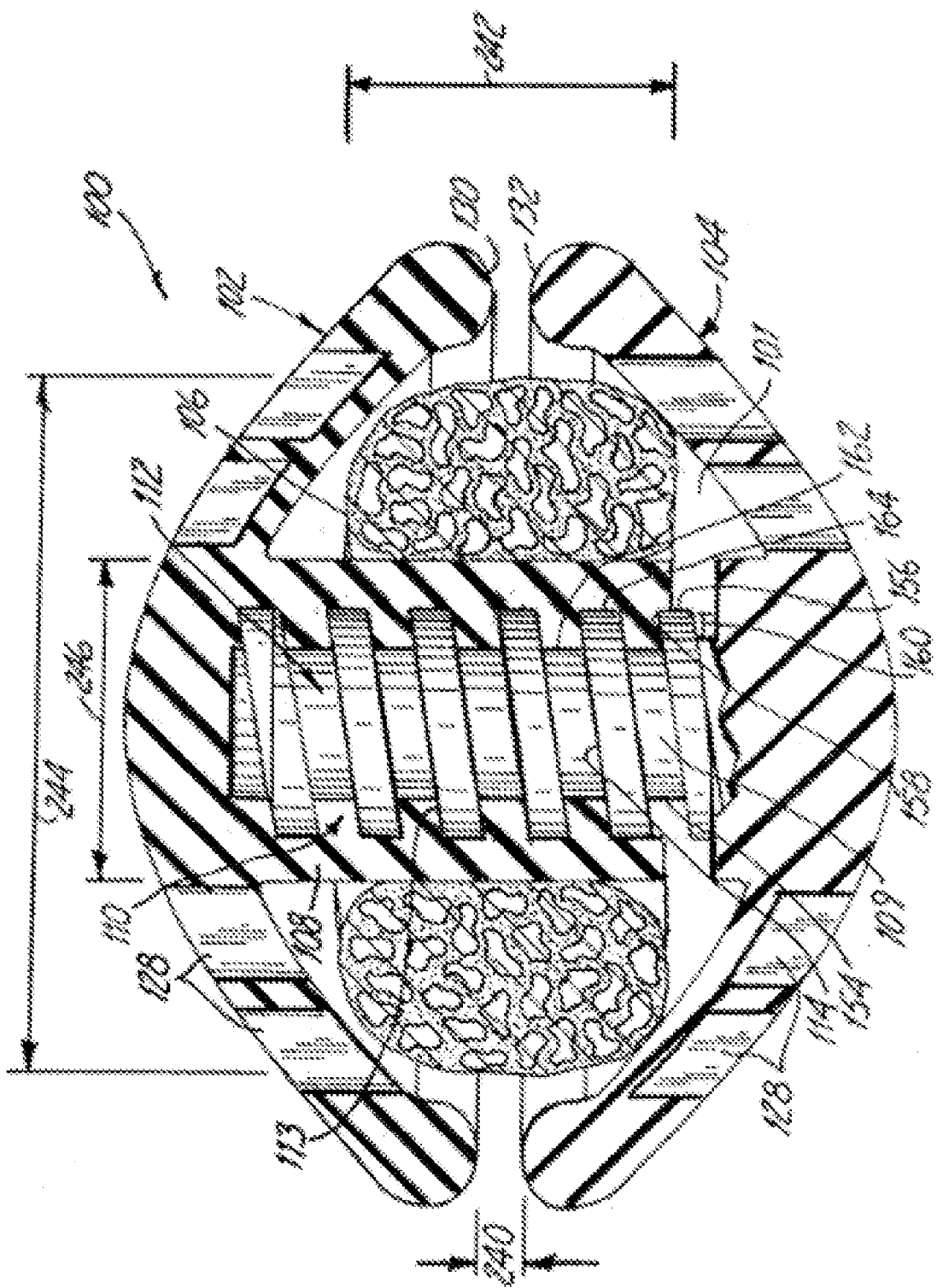
Figure 2:
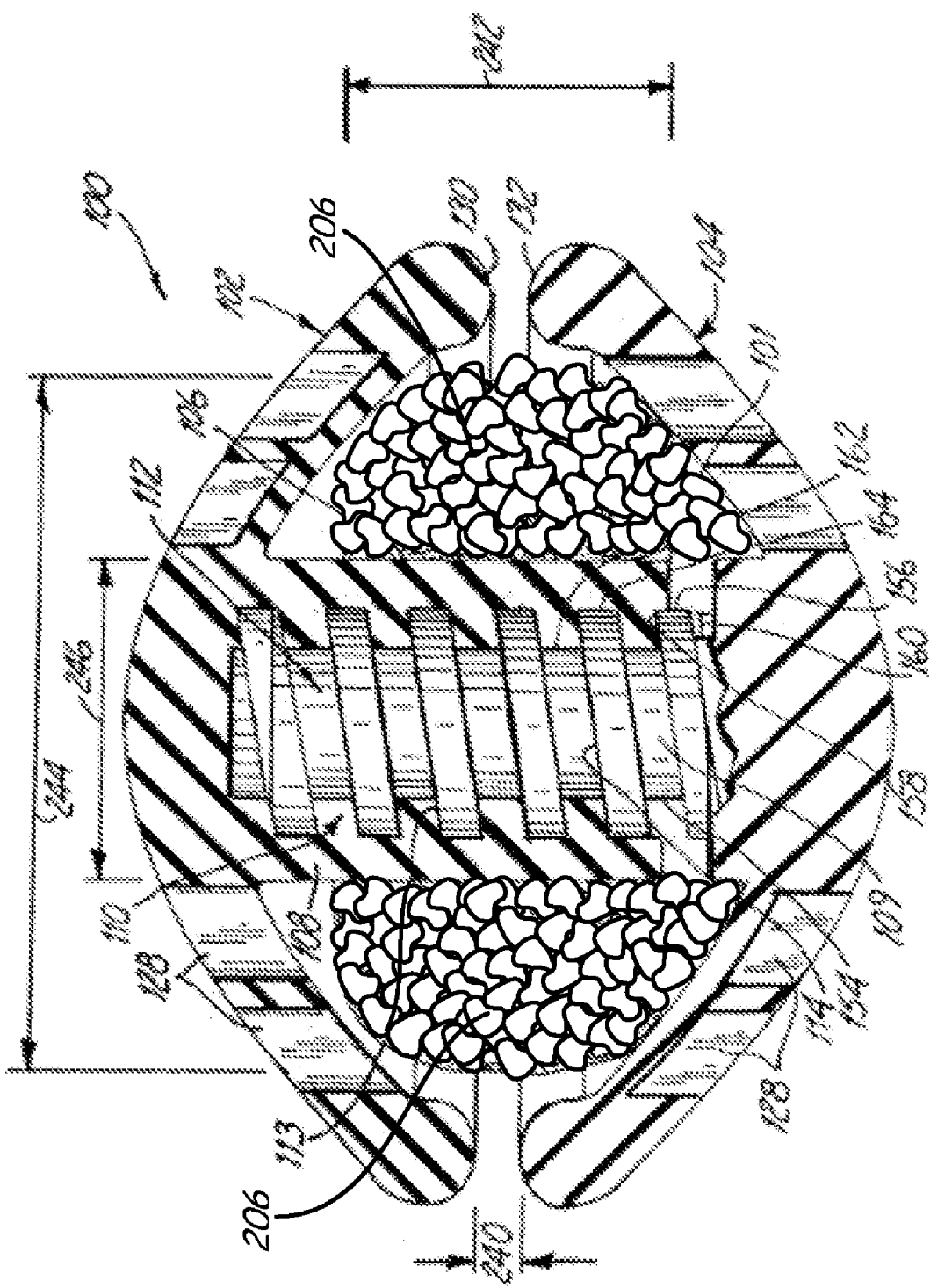

FIGS. 1 and 2 illustrate treat retaining pet toy 100 in accordance with a first embodiment of the present invention. Pet toy 100 includes first concave-shaped molded member 102, second concave-shaped molded member 104 and mating fasteners 110 and 112 constructed of a non-consumable, resilient or flexible material, such as a non-toxic elastomer or neoprene plastic and the like. First member 102 has first peripheral edge 130 and second member 104 has second peripheral edge 132. Those skilled in the art will appreciate that the toy illustrated in FIG. 1 has two molded parts and thus a cost-effective manufacturing process produces pet toy 100 with two different colors attractive to the owner or handler of the toy.

Fasteners 110 and 112 may be integrally molded with members 102 and 104, respectively, and may be fastened to form a treat retaining cavity 101 to retain a treat 106 (as illustrated in FIGS. 1 and 2-1) or other type of attractant, such as treats 206 illustrated in FIG. 2-2. Fasteners 110 and 112 mate to extend axially through treat retaining cavity 101 to selectively position first peripheral edge 130 of first member 102 and second peripheral edge 132 of second member 104 at a selected spacing. More particularly, relative engagement of fasteners 110 and 112 alter the axial position of the fasteners with respect to each other, thereby selectively adjusting the space between member 102 and 104.

Thus, as shown in FIGS. 2-1, 2-2, fasteners 110 and 112 selectively position first peripheral edge 130 of first member 102 relative to second peripheral edge 132 of second member 104 at a selected distance 240 such that treat retaining cavity 101 has predetermined selective height 242 relative to distance 240. The selective engagement of fasteners 110 and 112 result in a selected distance 240 between members 102 and 104 which creates a continuous and peripheral access about pet toy 100 to treat retaining cavity 101 that retains treat 106 illustrated in FIGS. 1 and 2-1 or treats 206 illustrated in FIG. 2-2. Selective height 242 has a minimum height when selected distance 240 is zero. This minimum height is substantially similar to the height of treat 106. Cavity 101 also has predetermined first diameter 244. First diameter 244 is substantially similar to the outer diameter of treat 106. In addition to constant first diameter 244 of cavity 101, fasteners 110 and 112 have a constant predetermined second diameter 246. It should be appreciated that any type of fastener, which would permit adjustment of the separation of first member 102 and second member 104, can be used to engage first member 102 and second member 104.

As illustrated in the embodiment of FIGS. 1 and 2, fasteners 110 and 112 include first center hub 108 formed with first member 102 and second center hub 109 formed with second member 104. First center hub 108 includes female threads 113 adapted to threadably engage male threads 114 included in second center hub 109. By engaging threads 113 to threads 114, pet toy 100 forms treat retaining cavity 101.

Threads 114 include roots 154 and crests 156 that have substantially squared edges. Flanks 158 at the sides of the threads connect roots 154 to crests 156 and have a depth 160. Threads 113 include roots 164 and crests 162 that have substantially squared edges and correspond with crests 156 and roots 154, respectively, of threads 114. Thus, depth 160 of threads 112 is substantially equal to the depth of the roots 162 to crests 164 of threads 113. Depth 160 is deep enough such that the animal is prevented from deforming the threads and pulling apart members 102 and 104. Advantageously, the entire pet toy 100 is constructed in elastomer such that the coefficient of friction between threads 113 and threads 114 is sufficiently high. A high coefficient prevents the carnivore from separating members 102 and 104 by inadvertently relatively rotating portions 102 and 104 or altering the handler's adjustment of the separation between them. In addition, the squared edges of threads 110 and threads 112 help prevent the carnivore from separating members 102 and 104.

Figure 3:
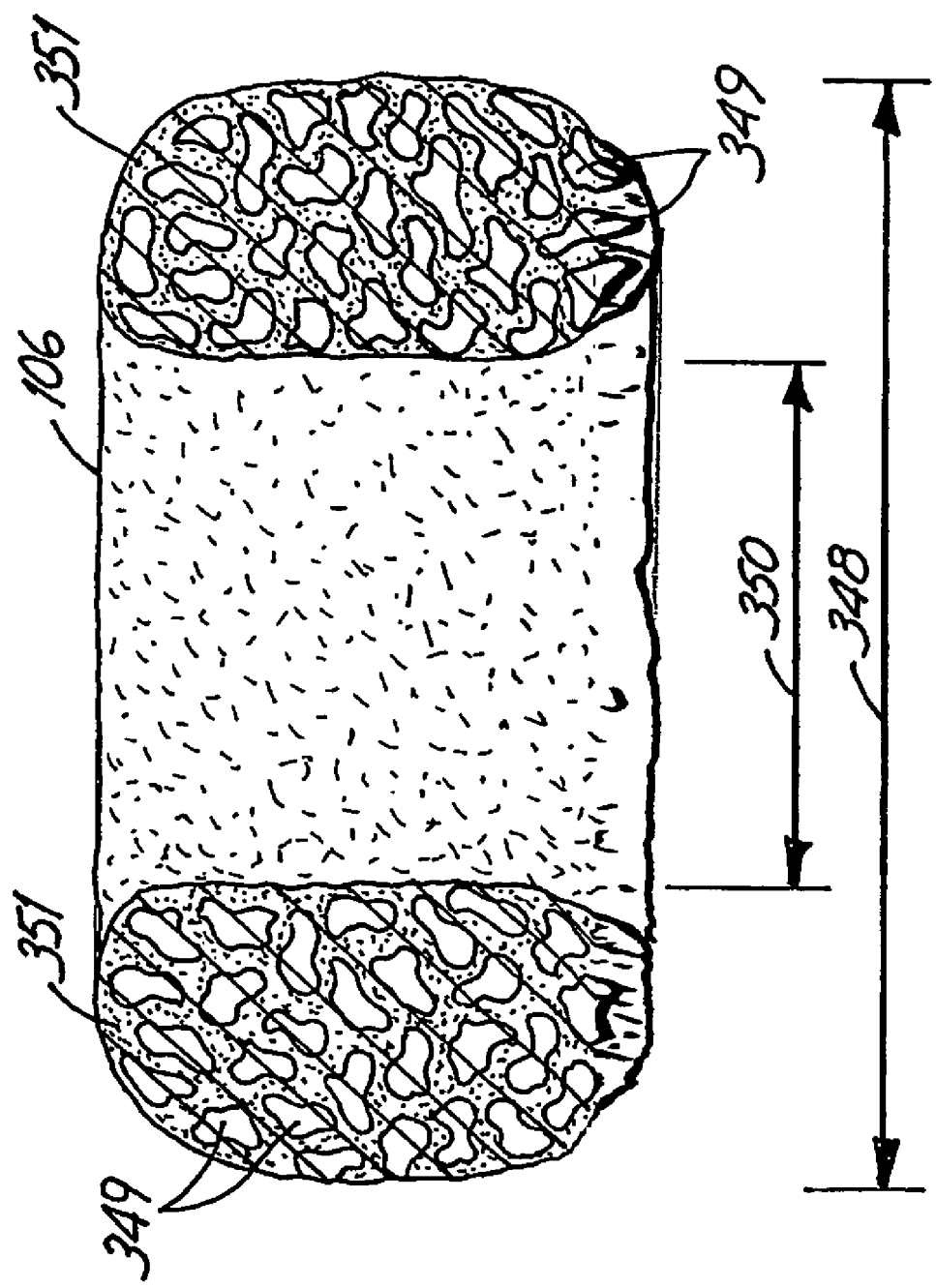
FIG. 3 is a section view of a treat in accordance with an embodiment of the present invention.

Prior to threadably engaging first member 102 to second member 104, treat 106 or treats 206 are received and arranged by either first center hub 108 or second center hub 109. FIG. 3 is a section view of treat 106 as shown in FIGS. 1 and 2-1. Treat 106 is a substantially solid, rigid and edible body in the shape of a toroid. Treat 106 has an outer diameter 348 that is substantially equal to or less than predetermined first diameter 244. Treat 106 has an inner diameter 350 that forms a center opening that is greater than the predetermined second diameter 246 of fasteners 110 and 112. In addition, the thickness of treat 106 is not greater than a minimum of predetermined selective height 242 of treat retaining cavity 101. For example, treat 106 is a plurality of bits or pieces 349 of a pet treat or edible material that is held together by an edible binder 351. Preferably, edible binder 351 is dissolved by the animal's saliva. In another example, treat 106 is a rigid animal biscuit. In such cases, attractant 106 has a shape relative to hubs 108 and 109 and cavity 101 formed by members 102 and 104 for being retained. In addition, granular or loose fitting treats 206 (illustrated in FIG. may also be retained in the toy as well as deformable food or treats, such as peanut butter.

Pet toy 100 also includes slots 128 in first member 102 and second member 104. Slots 128 vent the scent of the treat 106 (FIG. 2-1) or treats 206 (FIG. 2-2) to the carnivore and provide a dental prophylaxis outlet for carnivorous teeth. FIG. 1 also illustrates matching pairs of arcuate notches 134 and 136 on respective first peripheral edge 130 and second peripheral edge 132. One of the arcuate notches 134 joins with one of the arcuate notches 136 when the rotational positions of first member 102 and second member 104 are aligned. Notches 134 and 136 can be adjusted relative to each other to provide a variably-sized opening for additional access to treat 106 or to meter the dispensing of a granular treat 206.

In any case, the carnivore's handler places treat 106 or treats 206 in cavity 101 as shown in FIGS. 1, 2-1 and 2-2 and fastens members 102 and 104 together by relatively rotating the members. Rotating members 102 and 104 axially adjusts the spacing 240 between the members allowing the handler to select the space for the carnivore's access to the treat. Hence, a smaller space will result in a more difficult access to the treat than a larger space, thereby retaining the interest of the animal for a longer duration. But if space 240 is too small, the animal may lose interest in the toy and abandon the effort. Experience with spacing 240 adjustment by the handler will result in optimal spacing for the given animal.

In use, the carnivore chews on the toy in an attempt to loosen and obtain the attractant, thus providing the carnivore with masticatory exercise, as well as dental prophylaxis. The inclusion of the sensory attractant 106 or 206 is particularly advantageous as a training device, encouraging the carnivore to chew on the pet toy 100, rather than on furniture or other valuable items. In addition, the shape of the pet toy 100 is preferably non-spherical to aid in imparting erratic movements to pet toy 100 when rolled or bounced. Should the animal push or bounce pet toy 100, the non-symmetrical shape assures an erratic movement to the toy upon bouncing or rolling thereby providing exercise for the animal.

Figure 4:
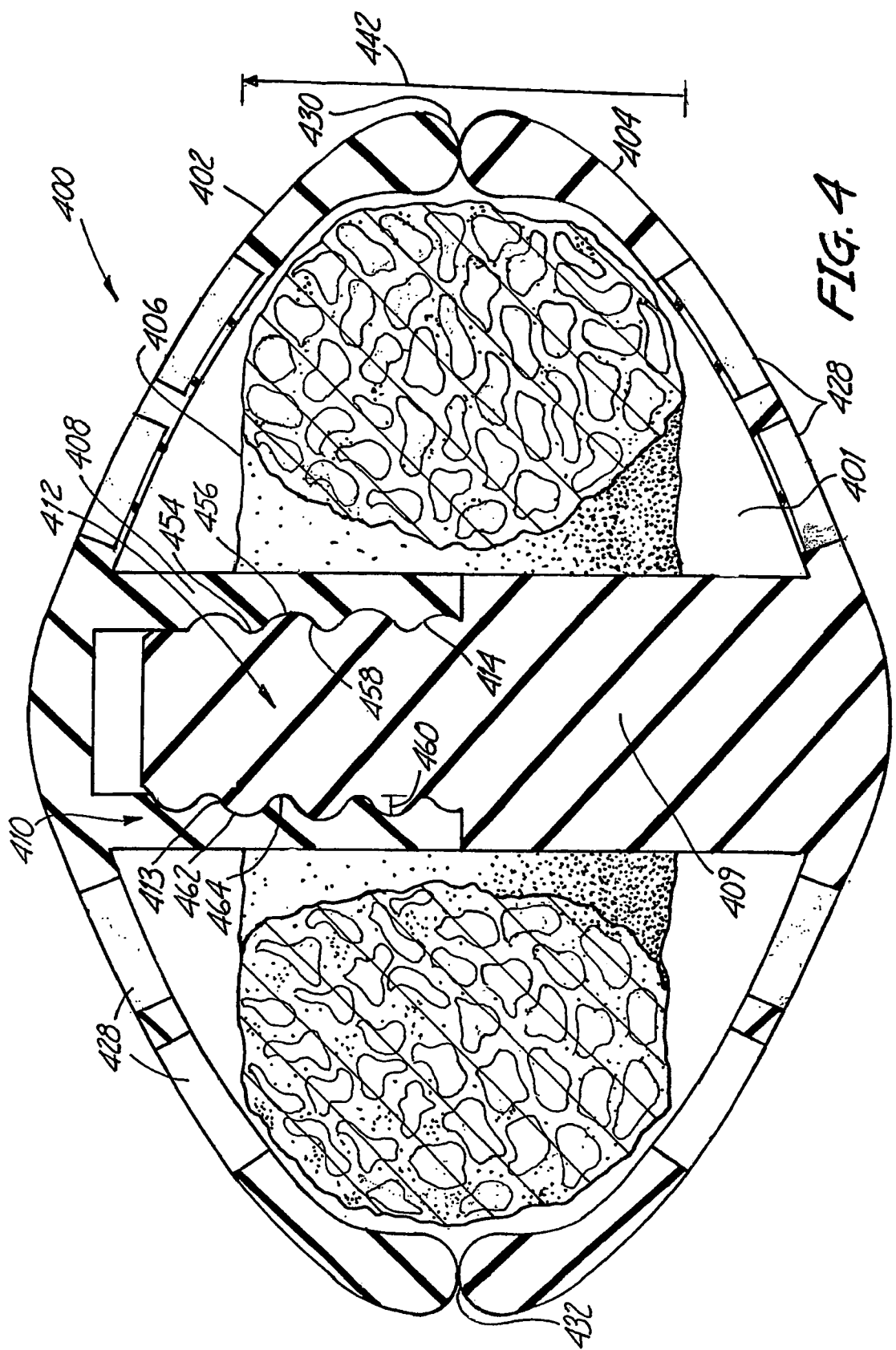
FIG. 4 is a section view of a treat retaining pet toy in accordance with a second embodiment of the present invention.

FIG. 4 is a section view of pet toy 400 in accordance with a second embodiment of the present invention. Pet toy 400 includes first concaved-shaped molded member 402, second concaved-shaped molded member 404 and fasteners 410 and 412 constructed of a non-consumable, resilient or flexible material, such as a non-toxic elastomer or neoprene plastic and the like. First member 402 has first peripheral edge 430 and second member 404 has second peripheral edge 432. Those skilled in the art will appreciate that the toy illustrated in FIG. 4 has two molded parts and thus a cost-effective manufacturing process produces pet toy 400 with two different colors attractive to the owner or handler of the toy.

FIG. 4 illustrates fasteners 410 and 412 selectively positioning first peripheral edge 430 of first member 402 relative to second peripheral edge 432 of second member 404 at a selected distance such that the treat retaining cavity 401 has a predetermined selective height 442 which is relative to the selected distance. In the embodiment shown in FIG. 4, fasteners 410 and 412 are selectively positioned such that there is no spacing between member 402 and 404. Thus, FIG. 4 illustrates selective height 442 at a minimum height. Fasteners 410 and 412 include first member 402 and second member 404 each having center hubs 408 and 409. First center hub 408 includes female threads 413. Second center hub 409 includes male threads 414 adapted to be threadably engaged with female threads 413. By engaging threads 413 with threads 414, first member 402 and second member 404 form treat retaining cavity 401 to retain treat 406.

Threads 414 include roots 454 and crests 456 that have rounded edges. Flanks 458 are the sides of the threads that connect roots 454 to crests 456 and have a depth 460. Threads 413 include roots 462 and crests 464 that have rounded edges and correspond with the crests 456 and roots 454, respectively, of threads 412. Thus, depth 460 of threads 414 is substantially equal to the depth of the roots 462 to crests 464 of threads 413. Like the embodiment of FIGS. 1 and 2, the entire pet toy 400 is constructed in elastomer such that the coefficient of friction between threads 413 and threads 414 is sufficiently high to prevent the carnivore from separating members 402 and 404.

Prior to threadably engaging first member 402 to second member 404, treat 406 is received and arranged by either first center hub 408 or second center hub 409. Treat 406 is substantially similar to treat 106 shown and discussed in the section view of FIG. 3. Pet toy 400 also includes slots 428, as previously discussed, as well as pairs of arcuate notches (not shown) existing on each of first peripheral edge 430 and second peripheral edge 432.

Figure 5:
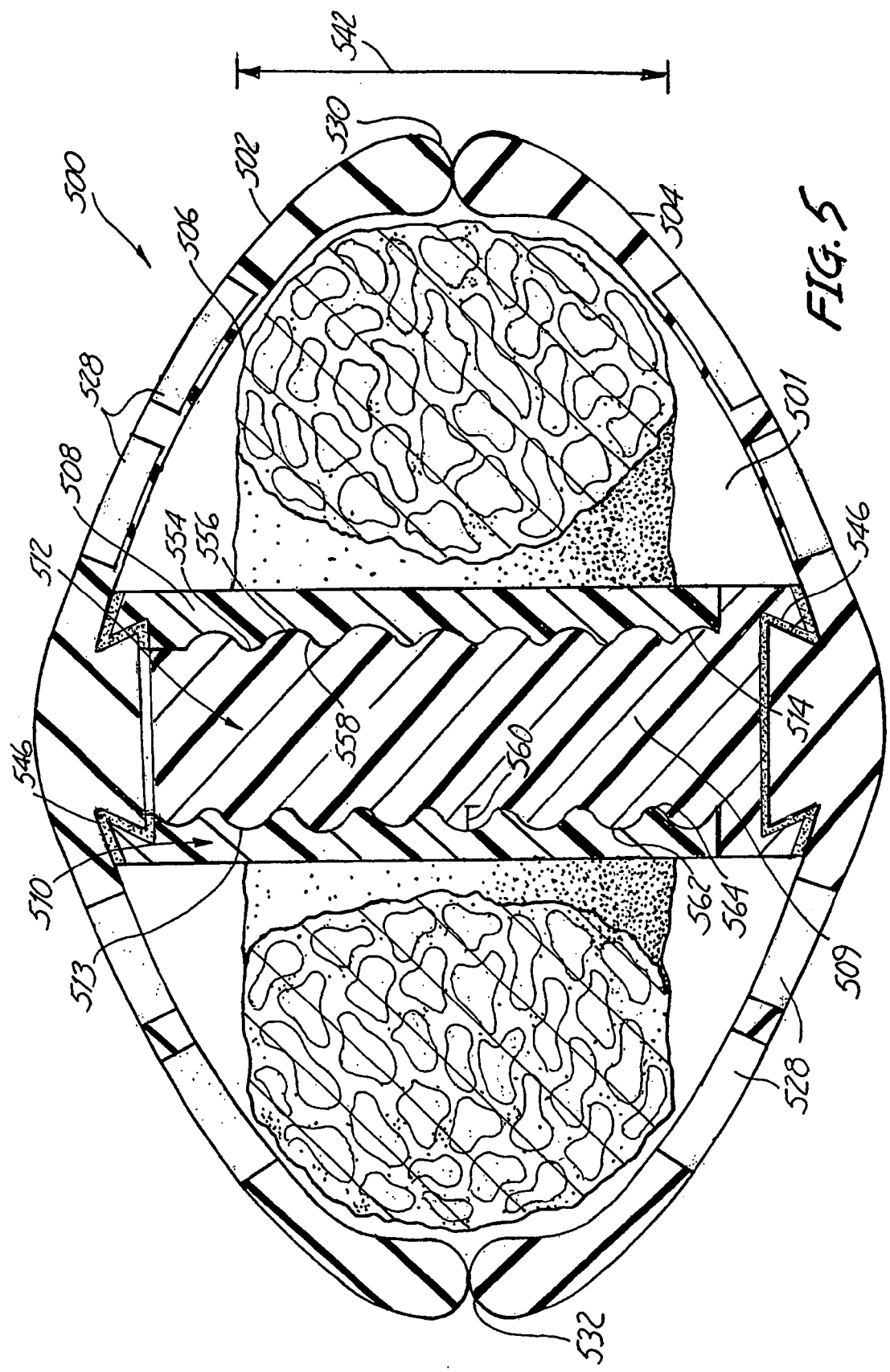
FIG. 5 is a section view of a treat retaining pet toy in accordance with a third embodiment of the present invention.

FIG. 5 is a section view of pet toy 500 in accordance with a third embodiment of the present invention. Pet toy 500 includes first concaved-shaped molded member 502, second concaved-shaped molded member 504 and fasteners 510 and 512. First and second members 502 and 504 are constructed of a non-consumable, resilient or flexible material, such as a non-toxic elastomer or neoprene plastic and the like. Fasteners 510 and 512 are constructed of a non-consumable stiff material, such as nylon and the like. First member 502 has first peripheral edge 530 and second member 504 has second peripheral edge 532. Those skilled in the art will appreciate that the toy illustrated in FIG. 5 has three molded parts and thus producing pet toy 500 with as many as three different colors attractive to the owner or handler of the toy.

FIG. 5 illustrates fasteners 510 and 512 selectively positioning first peripheral edge 530 of first member 502 relative to second peripheral edge 532 of second member 504 at a selected distance such that the treat retaining cavity 501 has predetermined selective height 542 which is relative to the selected distance. In the embodiment shown in FIG. 5, fasteners 510 and 512 are selectively positioned such that there is no spacing between member 502 and 504. Thus, as previously discussed, FIG. 5 illustrates selective height 542 at a minimum height. Fasteners 510 and 512 include center hubs 508 and 509 attached to first member 502 and second member 504, respectively, by adhesive 546. First center hub 508 includes female threads 513. Second center hub 509 includes male threads 514 adapted to be threadably engaged with female threads 513. By engaging threads 513 with threads 514, first member 502 and second member 504 form treat retaining cavity 501 to retain treat 506.

Where the pet toy, according to the present invention, is used with a large carnivore, such as a large breed dog, there is a risk that the superior strength of the large carnivore could deform the mating threads of the resilient fastener holding the members together. In such a case, the threads might deform to such an extent that the threads no longer engage to fasten the members. While the square shape to the threads, as in the case of the embodiments of FIGS. 1, 2 and 4, resist disengagement of the fasteners due to deformation of the threads, FIG. 5 presents an embodiment wherein fasteners 510 and 512 are formed of stiff nylon, or the like, to resist deformation.

Threads 514 include roots 554 and crests 556 that may have rounded edges. Flanks 558 are the sides of the threads that connect roots 554 to crests 556 and have a depth 560. Threads 513 include roots 562 and crests 564 that may have rounded edges and correspond with crests 556 and roots 554, respectively, of threads 514. Thus, depth 560 of threads 514 is substantially equal to the depth of the roots 562 to crests 564 of threads 513. In the embodiment of FIG. 5, center hubs 508 and 509 of fasteners 510 and 512 are constructed of a stiff nylon, and the like, such that the coefficient of friction between threads 513 and threads 514 is sufficiently high to prevent the carnivore from separating members 502 and 504. The stiffness of threaded fastener 510 and 512 is adequate to prevent the carnivore from deforming the threads in such a manner that might cause separation of members 502 and 504. In this case, members 502 and 504 can be molded from two castings or a single mold, and fasteners 510 and 512 are attached to members 502 and 504, such as by adhesive 546.

Prior to threadably engaging first member 502 to second member 504, treat 506 is received and arranged by either first center hub 508 or second center hub 509. Treat 506 is substantially similar to treat 106 shown and discussed in the section view of FIG. 3. Pet toy 500 also includes slots 528, as previously discussed, as well as pairs of arcuate notches (not shown) existing on each of first peripheral edge 530 and second peripheral edge 532.

Figure 6:
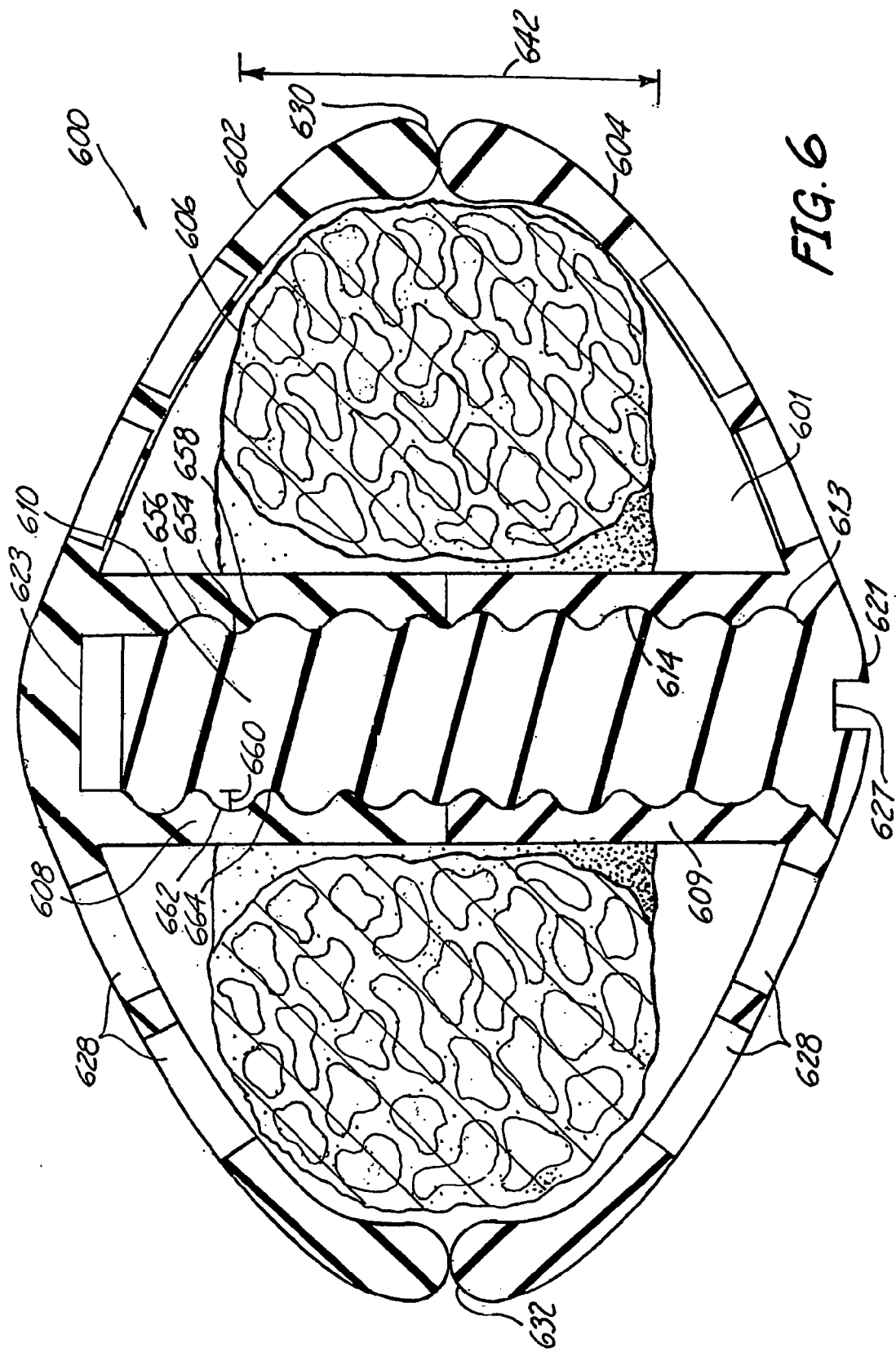
FIG. 6 is a section view of a treat retaining pet toy in accordance with a fourth embodiment of the present invention.

FIG. 6 is a section view of pet toy 600 in accordance with fourth embodiment of the present invention. Pet toy 600 includes first concaved-shaped molded member 602, second concaved-shaped molded member 604 and fastener 610. First and second members 602 and 604 are constructed of a non-consumable, resilient or flexible material, such as a non-toxic elastomer or neoprene plastic. Fastener 610, for example, can be constructed of a non-consumable stiff material, such as nylon and the like. Fastener 610, in another example, can be constructed with the resilient flexible material, and the like, of first and second members 602 and 604. First member 602 has first peripheral edge 630 and second member 604 has second peripheral edge 632. Those skilled in the art will appreciate that the toy illustrated in FIG. 6 has three molded parts and thus producing pet toy 600 with as many as three different colors attractive to the owner or handler of the toy.

FIG. 6 illustrates fastener 610 selectively positioning first peripheral edge 630 of first member 602 relative to second peripheral edge 632 of second member 604 at a selected distance such that the treat retaining cavity 601 has a predetermined selected height 642 which is relative to the selected distance. In the embodiment shown in FIG. 6, fastener 610 is selectively positioned such that there is no spacing between member 602 and 604. Thus, as previously discussed, FIG. 6 illustrates selective height 642 at a minimum height. Fastener 610 is a flathead screw having first end 621 and second end 623. First and second members 602 and 604 also include center hubs 608 and 609. First end 621 of fastener 610 has notch 627 to permit the owner or handler to screw the fastener 610 through a portion of hub 608 of first member 602 and through hub 609 of second member 604. Second end 623 can terminate variably within center hub 608. The termination point is adjustable depending on the amount of selectable spacing the owner would like between first peripheral edge 630 and second peripheral edge 632.

First center hub 608 includes female threads 613. Fastener 610 includes male threads 614 adapted to be threadably engaged with female threads 613. By engaging threads 613 with threads 614, first member 602 and second member 604 form treat retaining cavity 601 to retain treat 606. In FIG. 6, threads 613 are engaged with threads 614 such that there is no spacing between members 602 and 604.

Threads 614 include roots 654 and crests 656 that have rounded edges. Flanks 658 are the sides of the threads that connect roots 654 to crests 656 and have a depth 660. Threads 613 include roots 662 and crests 664 that have rounded edges and correspond with crests 656 and roots 654, respectively, of threads 614. Thus, depth 660 of threads 614 is substantially equal to the depth of the roots 662 to crests 664 of threads 613.

Prior to threadably engaging first member 602 to second member 604, treat 606 is received and arranged by either center hub 608 or center hub 609. Treat 606 is substantially similar to treat 106 shown and discussed in the section view of FIG. 3. Pet toy 600 also includes slots 628, as discussed in previous embodiments, as well as pairs of arcuate notches (not shown) existing on each of first peripheral edge 630 and second peripheral edge 632.

Figure 7:
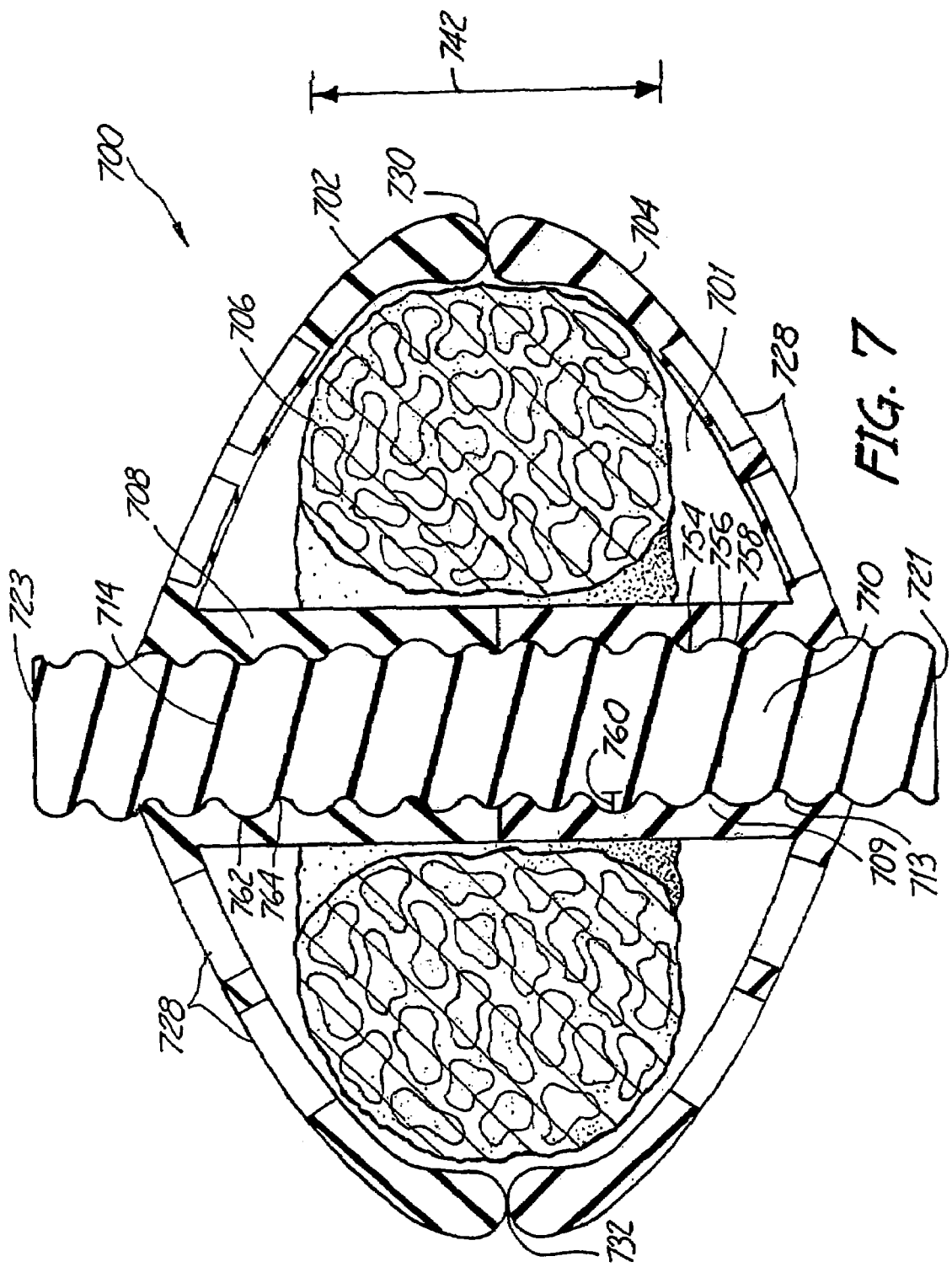
FIG. 7 is a section view of a treat retaining pet toy in accordance with a fifth embodiment of the present invention.

FIG. 7 is a section view of pet toy 700 in accordance with a fifth embodiment of the present invention. Pet toy 700 includes first concave-shaped molded member 702, second concave-shaped molded member 704 and fastener 710. First and second members 702 and 704 are constructed of a non-consumable, resilient or flexible material, such as a non-toxic elastomer or neoprene plastic and the like. Fastener 710, in one example, can be constructed of a non-consumable stiff material, such as nylon. Fastener 710, in another example, can be constructed of the resilient flexible material of first and second members 702 and 704. First member 702 has first peripheral edge 730 and second member 704 has second peripheral edge 732. Those skilled in the art will appreciate that the toy illustrated in FIG. 7 has three molded parts and thus producing pet toy 700 with as many as three different colors attractive to the owner or handler of the toy.

FIG. 7 illustrates fastener 710 selectively positioning first peripheral edge 730 of first member 702 relative to second peripheral edge 732 of second member 704 at a selected distance such that the treat retaining cavity 701 has predetermined selected height 742 which is relative to the selected distance. In the embodiment shown in FIG. 7, fastener 710 is selectively positioned such that there is no spacing between member 702 and 704. Thus, as previously discussed, FIG. 7 illustrates selective height 742 at a minimum height. First and second members 702 and 704 include first and second center hubs 708 and 709. Both center hubs 708 and 709 each have female threads 713 adapted to be threadably engaged with male threads 714 of fastener 710. Center hub 708 has threads 713 that extend completely through the center hub 708 and first member 702. Center hub 709 has threads 713 that extend completely through center hub 709 and second member 704. Fastener 710 has first end 721 and second end 723. First end 721 is substantially identical to second end 723 and permits the owner or handler to manually screw fastener 710 through first member 702 and second member 704. Second end 723 can terminate variably within center hub 708. The termination point is adjustable depending on the amount of separation the owner would like between first peripheral edge 730 and second peripheral edge 732.

Threads 714 include roots 754 and crests 756 that have rounded edges. Flanks 758 are the sides of the threads that connect roots 754 to crests 756 and have a depth 760. Threads 713 include roots 762 and crests 764 that have rounded edges and correspond with crests 756 and roots 754, respectively, of threads 714. Thus, depth 760 of threads 714 is substantially equal to the depth of the roots 762 to crests 764 of threads 713.

Prior to threadably engaging first member 702 to second member 704, treat 706 is received and arranged by first center hub 708 or second center hub 709. Treat 706 is substantially similar to treat 106 shown and discussed in the section view of FIG. 3. Pet toy 700 also includes slots 728, as discussed in previous embodiments, as well as two pairs of arcuate notches (not shown) existing on each of first peripheral edge 730 and second peripheral edge 732.

Figure 8:
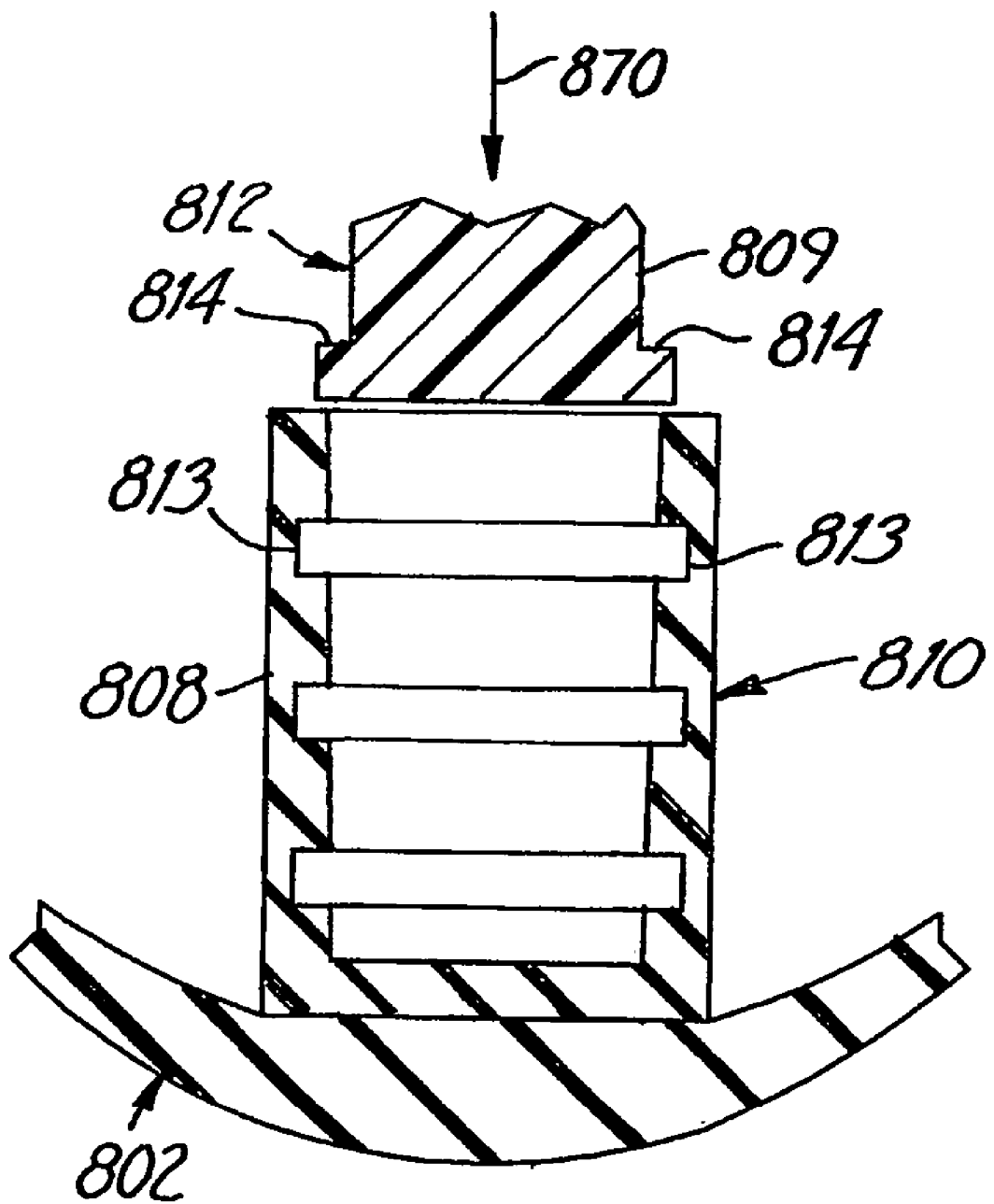
FIG. 8 is a section view of an alternative embodiment for the fastener of a treat retaining pet toy in accordance with the present invention.

FIG. 8 is a section view of fasteners 810 and 812 in accordance with the present invention. Fasteners 810 and 812 are an alternative embodiment of the threaded fasteners shown in previous embodiments. Unlike previous embodiments, fastener 812 constricts and fits with fastener 810 at different predetermined levels. Fasteners 810 and 812 position first member 802 and the second member (not shown in FIG. 8) at a selected predetermined distance from each other to create a peripheral access about a pet toy, such as pet toy 100 shown in FIGS. 1 and 2.

Fasteners 810 and 812 each have first and second center hubs 808 and 809, respectively. First center hub 808 is configured to engage second center hub 809 at a plurality of different levels. Second hub 809 includes ledge portion 814. First hub 808 includes a plurality of seat portions 813 each located at each different levels or axial positions. Ledge 814 is configured to deform and constrict through center hub 808 and to expand or return to its original configuration to fit into each of the seat portions 813 of center hub 808. Second center hub 809 is forced into first center hub 808 along its axis in general direction 870. Upon engaging first center hub 808 with second center hub 809, ledge 814 engages or "snaps into" successive seats 813 to engage the desired seat, thereby establishing a selected predetermined spacing by pulling the members apart to deform and constrict ledge 814 for removal from hub 808.

Although the present invention has been described with reference to preferred embodiments, workers skilled in the art will recognize that changes may be made in form and detail without departing from the spirit and scope of the invention.

What is claimed is:

1. A non-consumable pet toy comprising:
 a resilient first concave-shaped molded member including a first peripheral edge having a first arcuate notch;
 a resilient second concave-shaped molded member including a second peripheral edge having a second arcuate notch, the first and second concave-shaped members defining a treat-retaining cavity between them that a pet can at least partially interact with, said first and second members having non-planar outer surfaces; and
 a fastener extending through the treat-retaining cavity and fastening the first concave-shaped member to the second concave-shaped member such that the first peripheral edge is selectably spaced from the second peripheral edge.

2. The non-consumable pet toy of claim 1, wherein the fastener is adjustable relative to at least one of the first and second members to permit selection of the space between the first peripheral edge and the second peripheral edge.

3. The non-consumable pet toy of claim 1, wherein the first arcuate notch can be aligned with the second arcuate notch to form an opening to the treat-retaining cavity.

4. The non-consumable pet toy of claim 1, wherein the fastener comprises a threaded fastener.

5. The non-consumable pet toy of claim 1, wherein the first member has a first center hub and the second member has a second center hub, the first and second hubs form at least a portion of the fastener.

6. The non-consumable pet toy of claim 5, wherein the fastener comprises a threaded fastener that threadably engages the first and second center hubs.

7. The non-consumable pet toy of claim 6, wherein the fastener includes a threaded fastener having substantially squared threads.

8. The non-consumable pet toy of claim 5, wherein the fastener comprises a female fastener on the first center hub and a male fastener on the second center hub.

9. The non-consumable pet toy of claim 5, wherein the fastener is formed of a material different than the first member and the second member.

10. The non-consumable pet toy of claim 5, wherein the fastener is formed of rigid nylon.

11. The non-consumable pet toy of claim 10, wherein the first and second members comprise an elastomer.

12. The non-consumable pet toy of claim 5, wherein the first center hub includes a plurality of different levels each having a seat portion and the second center hub includes a ledge portion, the first center hub configured to engage the second center hub by constricting the ledge portion of the second center hub and by allowing the ledge portion to fit in each seat portion.

13. The non-consumable pet toy of claim 1, wherein the treat-retaining cavity includes a plurality of granular treats.

14. A method for entertaining an animal with a non-consumable pet toy, the method comprising:
providing a first concave-shaped molded member having a first peripheral edge and a second concave-shaped member having a second peripheral edge, the first and second members forming a treat-retaining cavity between them, said members having non-planar outer surfaces;
placing a treat into the treat-retaining cavity;
fastening the first and second members with a fastener to form a pet toy so that the first peripheral edge is a selected distance from the second peripheral edge, the fastener extending centrally through the treat-retaining cavity and the treat; and
giving the pet toy to the animal.

15. The method of claim 14, wherein fastening the first and second concave-shaped members further comprises adjusting the selectable distance between the first peripheral edge and the second peripheral edge to form a selected peripheral opening.

16. The method of claim 14, wherein fastening the first and second members further comprises threadably engaging a first center hub of the first concave-shaped member with a second center hub of the second concave-shaped member.

17. The method of claim 14, wherein fastening the first and second members further comprises threadably engaging the first member to the second member with a screw.

18. The method of claim 14, wherein fastening the first and second members further comprises engaging a first center hub of the first member with a second center hub of the second member by forcing a ledge portion of the second center hub through the first center hub to fit in a seat portion at a plurality of different levels in the first center hub.

19. The method of claim 14, wherein placing the treat into the treat-retaining cavity comprises filling the treat-retaining cavity with a plurality of granular treats.

* * * * *